Dec. 19, 1961 L. J. KOWAL 3,013,335
TUBE CUTTER
Filed March 4, 1960
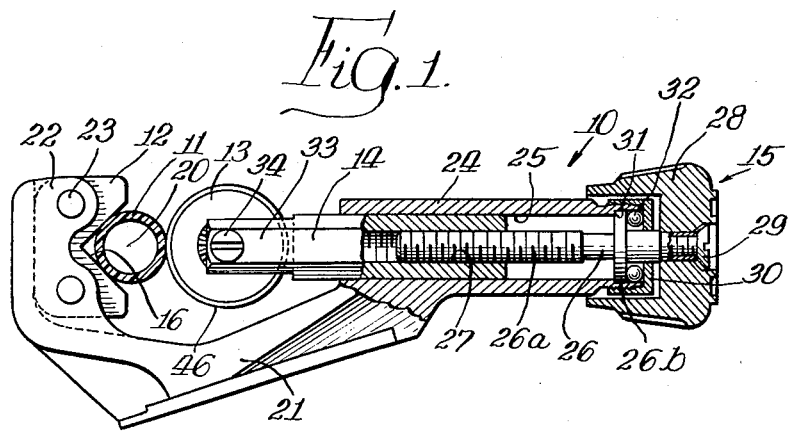
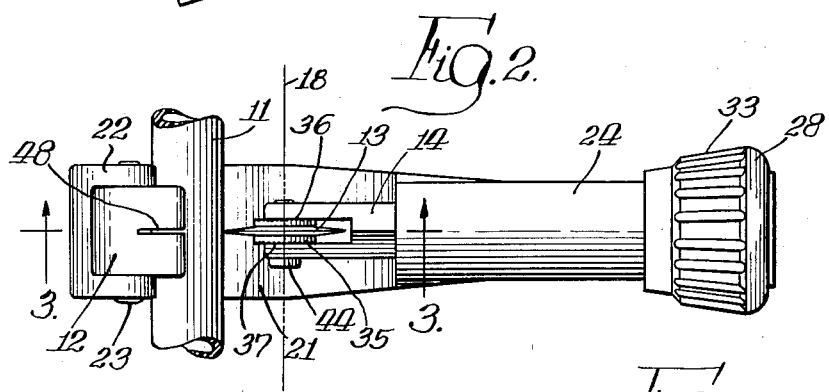
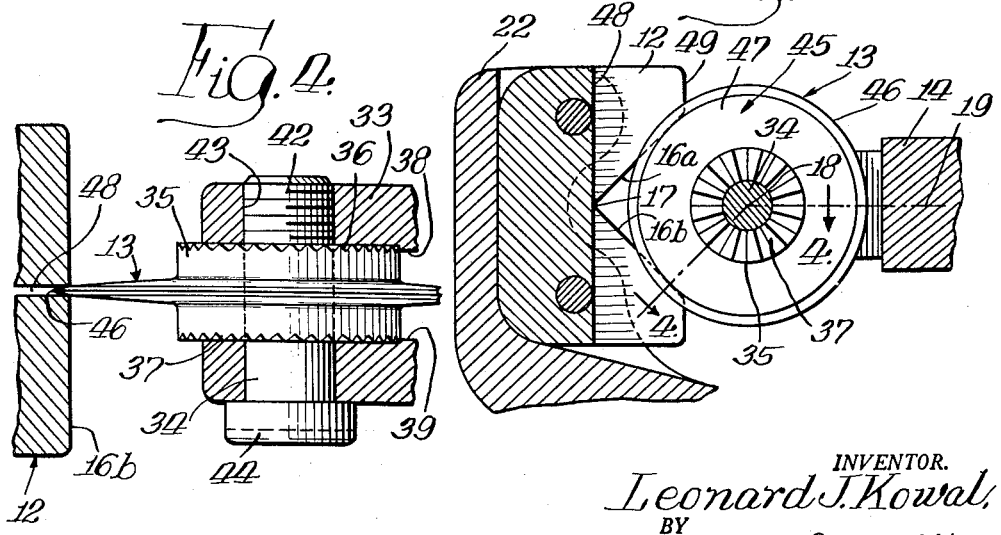
INVENTOR.
Leonard J. Kowal, United States Patent Office 3,013,335
Patented Dec. 19, 1961

3,013,335
TUBE CUTTER
Leonard J. Kowal, Prospect Heights, Ill., assignor to Imperial-Eastman Corporation, a corporation of Illinois
Filed Mar. 4, 1960, Ser. No. 12,860
9 Claims. (Cl. 30—94)

This invention relates to tube cutting tools and in particular to tools for use in cutting plastic tubing.

When the presently known tube cutters are utilized to cut plastic tubing, undesirable ragged ends and splits are often produced. The present invention comprehends a new and improved tube cutter effectively eliminating such undesirable deformations of the plastic tubing and assuring a clean accurate cut thereof.

It is a principal object of the present invention, therefore, to provide a new and improved tool for use in cutting elongated elements formed of a material such as plastic.

Another object is to provide such a tool arranged to cut plastic tubing cleanly and with improved facility.

Another object is to provide such a tube cutting tool including a disc having a peripheral tube cutting edge and securing means for fixing the disc on a carrier for reciprocal movement toward and from the supporting carrying the tube to be cut.

Still another object is to provide such a tube cutting tool wherein the securing means is arranged to fix adjustably the disc on the carrier with different portions of the cutting edge selectively confronting the support.

A still further object of the invention is to provide such a tube cutting tool including securing means fixing the disc on the carrier with the cutting edge confronting the support and wherein the support is further provided with a slot aligned with the disc to receive at least a portion of the cutting edge thereof at the limit of movement of the disc toward the support.

A yet further object is to provide such a tube cutting tool wherein the disc is provided with a portion radially inwardly adjacent the cutting edge having a width greater than the width of the slot to limit the insertion of the cutting edge into the slot.

Other features and advantages of the invention will be apparent from the following description taken in connection with the accompanying drawing wherein:

FIG. 1 is an elevation, partially in section, of a tube cutting tool embodying the invention;

FIG. 2 is a plan view thereof;

FIG. 3 is an enlarged, fragmentary section taken substantially along the line 3—3 of FIG. 2; and FIG. 4 is a fragmentary section taken substantially along the line 4—4 of FIG. 3.

In the exemplary embodiment of the invention as disclosed in the drawing, a tool, generally designated 10, for use in cutting elongated elements formed of material such as plastic, e.g., nylon tubing 11, comprises a tube support 12, a cutting disc 13, a carrier 14 and apparatus 15 for associating the carrier 14 with the support 12 for reciprocal movement of the cutting disc to and from the support.

More specifically, support 12 comprises a rigid block having a V-section groove 16 defining a channel arranged to receive partially the plastic tube 11 to hold the tube firmly during the cutting operation. Herein, groove 16 is defined by a pair of planar surfaces 16a and 16b extending allochirally at 45° to a plane containing the intersection 17 thereof, the axis 18 of disc 13, and the axis 19 of carrier 14. Thus, as best seen in FIGS. 1 and 2, surfaces 16a and 16b of groove 16 automatically align the axis 20 of tube 11 in this common plane and parallel to axis 18 of disc 13.

Apparatus 15 for associating the carrier 14 with support 12 includes a body 21 having a bifurcated end 22 receiving partially the block 12 which is fixedly secured therein by suitable means such as rivets 23. The opposite end 24 of body 21 comprises a tubular portion having a bore 25 of hexagonal cross section and slidably receiving the complementarily hexagonal carrier 14. Axial reciprocable movement of the carrier therein is effected by a rod 26 having a threaded portion 26a cooperating with a threaded bore 27 opening coaxially through the outer end of the carrier. Rod 26 is rotated by means of a knob 28 secured to the outer end thereof by suitable means such as screw 29. Rod 26 is retained against axial movement by a collar 26b thereon outwardly of threaded portion 26a peripherally engaging an outwardly facing, radial shoulder 31 in the outer end of body portion 24, a cap 30 threadedly secured to the outer end of tubular body portion 24, and ball bearings 32, interposed between collar 26b and cap 30. As best seen in FIG. 2, knob 28 may be provided exteriorly with a plurality of longitudinally extending, circumferentially spaced ribs 33 providing facilitated manipulation thereof.

Disc 13 is secured to an inner bifurcated end 33 of carrier 14 by a screw 34. As best seen in FIGS. 2 and 3, disc 13 includes a hub portion 35 having a substantial axial thickness. The opposite, longitudinally outward faces 36 and 37 of the hub 35 are radially grooved for improved gripping coaction with the confronting surfaces 38 and 39 of the arms 40 and 41 respectively of carrier end 33. This gripping engagement is effected by screw 34 which has its threaded portion 42 co-operating with a complementarily threaded hole 43 in leg 40 and its head 44 abutting the outer surface of leg 41. Thus, by tightening screw 34, the legs 40 and 41 are drawn together forcibly engaging the grooved surfaces 36 and 37 of the disc hub and positively locking the disc in any one of an infinite plurality of angularly related positions about its axis.

As best seen in FIGS. 3 and 4, the thin cutting portion 45 of the disc includes an annular knifelike cutting edge 46 and a radially inwardly thickening portion 47 extending between the cutting edge 46 and hub 35. Illustratively, the diameter of the cutting edge 46 may be approximately one inch, the radial extent of the cutting edge may be approximately 3/64", the thickness of the disc at the junction of the cutting edge 46 and the taper portion 47 may be approximately .015", the thickness of the taper portion 47 adjacent the hub 35 may be approximately .040", and the radial extent of the disc outwardly from hub 35 may be approximately 7/32".

To preclude the engagement of the cutting edge 46 with the support block 12, which engagement would tend to dull the cutting tip, the support block is provided with a narrow slot 48 extending outwardly from the inner face 49 of the support block to a plane containing the intersection 17 of the channel surfaces 16a and 16b and perpendicular to axis 19. The flat plane of slot 48 is aligned with the flat central plane of disc 13 so that at the limit of movement of the disc toward the support 12 the cutting edge 46 is received within the slot, as best seen in FIGS. 3 and 4. The width of slot 48 is preferably comparable to the width of the disc at the junction of cutting edge 46 and taper portion 47. Thus, the annular portion of the disc radially inwardly juxtaposed to the cutting edge has a width slightly greater than the width of the slot and thereby limits the insertion of the cutting edge into the slot.

To cut a plastic tube with tool 10, the tube is arranged, as shown in FIGS. 1 and 2, to be bottomed in channel 16 in support block 12 to extend axially perpendicular to the cutting disc 13. Knob 28 is then rotated on body end 24 to turn rod 26 suitably to move carrier 14 and disc 13 on the inner end 33 thereof toward the tube 11.

When the disc reaches the point of firm engagement with the exterior surface of the tube 11, a rotation of the entire tool 10 about the axis 20 of the tube is effected to cause the cutting edge 46 of the cutting disc 13 to cut the outer surface of the tube in the manner of a knife. As the disc is fixed against rotation on carrier end 33, the cutting edge cannot roll on the tube surface but must cleanly sever the annular portion in the path of the cutting edge 46 as the tool is swung about the tube axis 20. Knob 28 is then turned further to advance further the disc into the tube wall to deepen the cut in the tube wall as further rotation of the entire tool about axis 20 is effected. The joint advance of the cutter disc 13 and the rotation of the tool about the tube is continued until the cutting edge 46 has cut through the tube wall fully about the axis 20 to separate the tube into two cleanly cut portions.

The slot 48 in the support block 12 permits the cutting edge 46 of the disc 13 to be advanced sufficiently close to the support block to permit the cutting of relatively small diameter tubes. As the insertion of the cutting edge 46 into the slot is limited by the widened portion of the disc radially inwardly adjacent the cutting edge, the cutting edge can at no time be damaged by engaging the support block. Further, whenever the portion of the cutting edge presented innermost to effect the cutting of the tube becomes dulled as a result of the cutting operations, the user may release the secured engagement of the disc with the carrier end 33 by threading screw 44 slightly outwardly from threaded hole 43. The disc may then be rotated on screw 44 to present a different circumferential portion of the cutting edge toward the channel 16 and the screw 44 may then be retightened to secure fixedly the disc in the adjusted position. Tube cutting operations may then be effected with the newly selected portion of the cutting edge cutting the tubing as discussed above. When the newly selected portion of the cutting edge becomes dulled, still another portion thereof may be positioned in the tube cutting position, and the selective positioning of the different portions of the cutting edge continued until the entire 360° of the cutting edge has been used. At such time as the entire edge of the disc becomes dulled, the disc may be readily removed from the carrier by removal of the screw 44 permitting a replacement disc having a sharp edge to be reinstalled for use in the tool 10 as discussed above.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A tool for use in cutting elongated elements formed of a material such as plastic, comprising: a support having a channel arranged to receive partially an elongated element to be cut; a carrier; means associating the carrier with the support for reciprocable movement transversely to the channel; a disc having a peripheral cutting edge; and securing means adjustably fixing the disc on the carrier with different portions of said cutting edge selectively confronting the channel for cutting movement of the disc through the channel.

2. The tool of claim 1 wherein the peripheral cutting edge extends 360° and the securing means selectively fixes the disc on the carrier selectively in each of at least four angularly related positions spaced 90° apart.

3. The tool of claim 1 wherein the peripheral cutting edge extends 360° and the securing means selectively fixes the disc on the carrier selectively in any of an infinite plurality of angularly related positions.

4. A tool for use in cutting elongated elements formed of a material such as plastic, comprising: a support having a channel arranged to receive partially an elongated element to be cut; a carrier; means associating the carrier with the support for reciprocable movement transversely to the channel; a disc having a peripheral cutting edge; and securing means adjustably fixing the disc on the carrier with different portions of said cutting edge selectively confronting the channel for cutting movement of the disc through the channel, said securing means comprising a serrated hub on the disc and means forcibly engaging the carrier therewith.

5. A tool for use in cutting elongated elements formed of a material such as plastic, comprising: a support having a channel arranged to receive partially an elongated element to be cut; a carrier; means associating the carrier with the support for reciprocable movement transversely to the channel; a disc having a peripheral cutting edge; and securing means fixing the disc on the carrier with said cutting edge confronting the channel for cutting movement of the disc through the channel, said support further having a slot opening into said channel and aligned with said disc to receive at least a portion of said cutting edge at the limit of movement of the disc through the channel toward the support.

6. The tool of claim 5 wherein said disc is provided with a portion radially inwardly adjacent the cutting edge having a width greater than the width of the slot to limit the insertion of the cutting edge into the slot.

7. The tool of claim 5 wherein the disc is tapered radially to increase the thickness of the disc radially inwardly from the cutting edge and provide a portion adjacent the cutting edge thicker than the width of the slot to limit the insertion of the cutting edge into the slot.

8. A tool for use in cutting elongated elements formed of a material such as plastic, comprising: a support arranged to retain an elongated cutting element during a cutting thereof; a carrier; means associatting the carrier with the support for reciprocable movement toward and from the support; a disc having a peripheral cutting edge; securing means fixing the disc on the carrier with said cutting edge confronting the support for cutting movement of the disc through the element retained by the support, said support further having a slot opening and aligned with said disc to receive at least a portion of said cutting edge at the limit of movement of the disc toward the support; and means limiting the movement of the disc toward the support to preclude bottoming of the cutting edge against the support in the slot.

9. A tool for cutting plastic tubing comprising: a support having a channel arranged to receive partially a plastic tube to be cut; a carrier; means associating the carrier with the support for reciprocable movement, transversely to the channel; a disc having a peripheral cutting edge extending 360° about the axis of the disc; and securing means adjustably fixing the disc on the carrier with different portions of said cutting edge selectively confronting the channel for cutting movement of the disc through the channel, said support further having a slot opening into said channel and aligned with said disc to receive at least a portion of said cutting edge at the limit of movement of the disc through the channel toward the support, said disc being provided with a portion radially inwardly adjacent the cutting edge having a width greater than the width of the slot to limit the insertion of the cutting edge into the slot.

References Cited in the file of this patent

UNITED STATES PATENTS 1,773,096    Cousineau    Aug. 19, 1930
2,629,926    Frank    Mar. 3, 1953